US006111765A

United States Patent [19]

Ganser et al.

[11] Patent Number: 6,111,765

[45] Date of Patent: Aug. 29, 2000

[54] DISCHARGE LAMP OPERATING CIRCUIT USING PIEZOELECTRIC TRANSFORMER AND PROTECTIVE DEVICE

[75] Inventors: Hans G. Ganser; Dieter Leers, both of Stolberg; Klaus Löhn, Simmerath-Lammersdorf; Martin Ossmann, Aachen, all of Germany; Pieter Postma, Eindhoven, Netherlands

[73] Assignee: U.S. Philips Corporation, New York, N.Y.

[21] Appl. No.: 09/140,812

[22] Filed: Aug. 26, 1998

[30] Foreign Application Priority Data

Sep. 1, 1997 [EP] European Pat. Off. .............. 97202685
Jun. 24, 1998 [EP] European Pat. Off. .............. 98202101

[51] Int. Cl.[7] .............. H02H 7/122
[52] U.S. Cl. .............. 363/55; 323/901
[58] Field of Search .............. 363/51, 55, 56, 363/58, 16, 97, 131; 323/901, 908

[56] References Cited

U.S. PATENT DOCUMENTS 5,548,189 8/1996 Williams .............. 315/224
5,705,877 1/1998 Shimada .............. 310/318
5,731,652 3/1998 Shimada .............. 310/316
5,739,679 4/1998 Takehara et al. .............. 323/299
5,760,619 6/1998 Yamaguchi .............. 327/110
5,834,907 11/1998 Takehara .............. 315/307
5,894,184 4/1999 Furuhashi et al. .............. 310/316

*Primary Examiner*—Shawn Riley
*Assistant Examiner*—Bao Q. Vu
*Attorney, Agent, or Firm*—Bernard Franzblau

[57] ABSTRACT

A circuit for operating a discharge lamp having circuit input terminals for connection to a supply voltage source and an inverter coupled to the circuit input terminals for generating an AC voltage at a frequency f from a supply voltage supplied by the supply voltage source. A piezotransformer has transformer input terminals coupled to the inverter output terminals. Terminals for lamp connection are coupled to the inverter output terminals and is provided for detecting whether the lamp has ignited. A protective device is coupled between the output terminals of the inverter and the transformer output terminals so that the inverter is effectively protected against damage due to ignition pulses generated by the piezotransformer.

19 Claims, 2 Drawing Sheets

DISCHARGE LAMP OPERATING CIRCUIT USING PIEZOELECTRIC TRANSFORMER AND PROTECTIVE DEVICE

BACKGROUND OF THE INVENTION

This invention relates to a circuit arrangement for operating a lamp comprising

- circuit input terminals for connection to a supply voltage source, an inverter coupled to said circuit input terminals for generating an AC voltage with a frequency f from a supply voltage supplied by the supply voltage source and equipped with inverter output terminals,
- a piezotransformer comprising transformer input terminals, coupled to the inverter output terminals, and transformer output terminals,
- terminals for lamp connection coupled to the inverter output terminals, and
- a detector for detecting whether the lamp has ignited.

Such a circuit arrangement is known from Jp H6-89789. The known circuit arrangement is very suitable for operating a discharge lamp and comprises a switching circuit part that connects the inverter output to the transformer input during the ignition of the lamp. The lamp is directly connected to the transformer output terminals. The frequency f of the AC voltage generated by the inverter is very close to one of the resonance frequencies of the piezotransformer. Therefore the AC voltage is transformed by the piezotransformer to an ignition voltage with the same frequency f but a much higher amplitude that is present across the lamp. After the lamp has ignited under the influence of this ignition voltage, the detector which is part of the circuit arrangement, detects a lamp current and generates a signal that triggers the switching circuit part to disconnect the inverter output and the transformer input. After the transformer input has been disconnected from the inverter output, the piezotransformer no longer generates the ignition voltage and the lamp is operated by means of the AC voltage at the frequency f that is generated by the inverter. An important advantage of the known circuit arrangement is that the inverter is used both in the generation of the voltage that is used to operate the lamp during stationary conditions as well as in the generation of the ignition voltage. For this reason the known circuit arrangement comprises a relatively small amount of components and is therefore relatively inexpensive and compact. A disadvantage of the known circuit arrangement, however, is that during ignition the high ignition voltage is present between the output terminals. This can easily lead to damage to the inverter.

SUMMARY OF THE INVENTION

The invention aims to provide a circuit arrangement for operating a lamp in which a separate oscillator for driving the piezotransformer can be dispensed with and in which the inverter can not be damaged by the ignition of the lamp.

A circuit arrangement as described in the opening paragraph is therefore characterized in that the circuit arrangement is equipped with a protective device coupled between the output terminals of the inverter and the transformer output terminals.

The protective device assures that the voltage that is present between the output terminals of the inverter during ignition of the lamp has a lower amplitude than the voltage that is present between the output terminals of the piezotransformer, and thereby prevents damage to the inverter.

Good results have been obtained with a circuit arrangement according to the invention, wherein the protective device comprises a filter.

Good results have also been obtained with a circuit arrangement according to the invention, wherein the protective device comprises a switching element and control circuitry coupled to the detector for controlling the switching element into a non-conductive state during ignition and into a conductive state after ignition.

Since the frequency at which the piezotransformer effectively generates a high ignition voltage in practice often differs from the operating frequency of the lamp during stable operation thereof, a circuit arrangement according to the invention preferably comprises a frequency control circuit coupled to the detector for changing the frequency f after ignition. Preferably the frequency control circuit changes the frequency from a first fixed value before ignition to a second fixed value after ignition.

The detector may comprise a current sensor that directly or indirectly measures a current through the lamp. In this way the detector is realized in a relatively simple and effective way.

Good results have been obtained for a circuit arrangement according to the invention, wherein the inverter comprises a bridge circuit.

A relatively simple and inexpensive embodiment of a circuit arrangement according to the invention is obtained when the transformer input terminals are connected directly to the inverter output terminals.

BRIEF DESCRIPTION OF THE DRAWINGS

Embodiments of a circuit arrangement according to the invention will be illustrated making use of the accompanying drawing.

In the drawing

DESCRIPTION OF THE PREFERRED EMBODIMENTS

Figure 1:
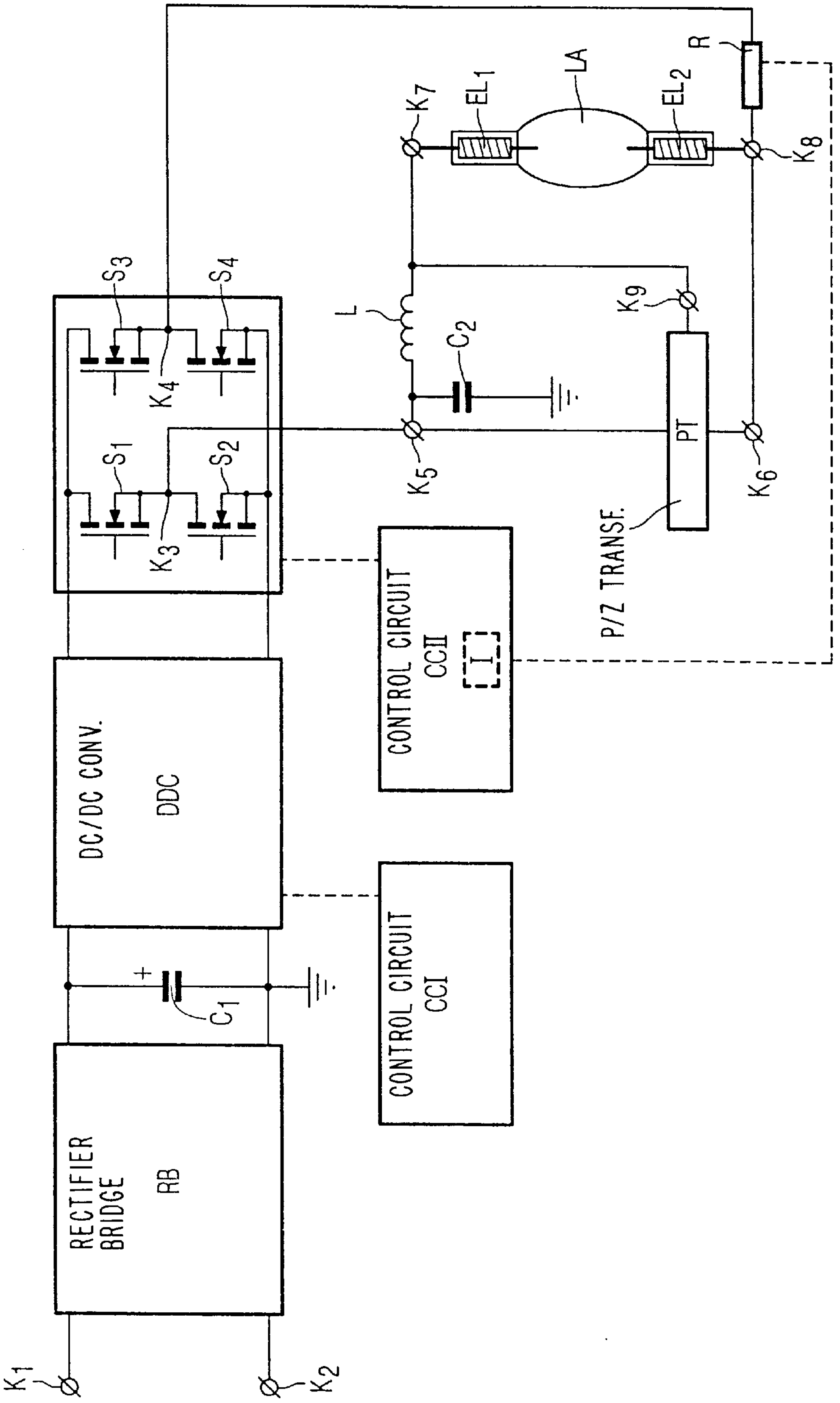
FIG. 1 shows a schematic representation of a first embodiment of a circuit arrangement according to the invention with a lamp connected to it.

In FIG. 1, K1 and K2 are circuit input terminals for connection to a supply voltage source. K1 and K2 are connected to respective input terminals of rectifier bridge RB. Output terminals of rectifier bridge RB are connected by means of a capacitor C1 functioning as a buffer capacitor. One end of capacitor C1 is connected to ground potential. Respective ends of capacitor C1 are connected to input terminals of a DC-DC-converter DDC comprising inductive means, unidirectional means and at least one switching element. A control electrode of the switching element is connected to a first control circuit CC1 for generating a control signal for rendering the switching element conductive and non-conductive at a high frequency. This connection is represented schematically in FIG. 1 by means of a dotted line connecting an output terminal of the first control circuit CC1 with an input terminal of the DC-DC-converter DDC. Output terminals of the DC-DC-converter are connected to respective input terminals of a full bridge circuit that is formed by the series arrangement of switching elements S1 and S2, the series arrangement of switching elements S3 and S4 and the second control circuit CCII for rendering the switching elements S1–S4 conducting and non-conducting at a frequency f. Respective output terminals of second control circuit CCII are connected to the respective control electrodes of the switching elements S1–S4. These connections are shown schematically by means of the dotted line that connects second control circuit CCII to the full bridge circuit. The DC-DC-converter DDC together with the first control circuit CC1 and the full bridge circuit together form an inverter for generating an AC voltage with frequency f from a supply voltage. The second control circuit CCII comprises a circuit part I. Circuit part I forms the means for changing the frequency f in response to the ignition of the lamp. For this purpose circuit part I is coupled to resistor R. This coupling is indicated by means of a dotted line. K3 and K4 are inverter output terminals. K5 and K6 are input terminals of piezotransformer PT. K7 and K8 are terminals for lamp connection. Output terminal K3 is connected to input terminal K5 and output terminal K4 is connected to both input terminal K6 and lamp connection terminal K8 via ohmic resistor R. Input terminal K5 is connected to terminal K7 for lamp connection by means of a choke L. Input terminal K5 is also connected to ground potential by means of capacitor C2. Choke L and capacitor C2 together form a filter that acts as a protective device in this embodiment. Ohmic resistor R forms a detector for detecting whether the lamp has ignited. Output terminal K9 of piezotransformer PT is connected to lamp connection terminal K7. In the embodiment shown in FIG. 1, K6 forms another output terminal of piezotransformer PT. A high pressure discharge lamp La comprising electrodes E11 and E12 is connected to the terminals for lamp connection.

The operation of the circuit arrangement shown in FIG. 1 is as follows.

When the circuit input terminals are connected to the poles of a supply voltage source supplying a low frequency AC supply voltage, the low frequency AC supply voltage is rectified by means of the rectifier bridge RB, so that a DC voltage is present on capacitor C1. The first control circuit CCI renders the switching element comprised in the DC-DC-converter DDC conducting and non-conducting at a high frequency. As a result the DC voltage present across capacitor C1 is converted by means of DC-DC-converter DDC into a substantially constant DC voltage present between the input terminals of the full bridge circuit. The second control circuit CCII renders on the one hand switching elements S1 and S4 and on the other hand switching elements S2 and S3 alternately conducting and non-conducting at a frequency f. Out of the substantially constant DC voltage that is present between its input terminals, the full bridge circuit generates a substantially square wave shaped AC voltage at a frequency f that is present between the inverter output terminals K3 and K4. This substantially square wave shaped AC voltage is also present between the transformer input terminals K5 and K6. During lamp ignition the frequency f is chosen so that it is very close to one of the resonance frequencies of the piezotransformer PT. The piezotransformer transforms the substantially square wave shaped AC voltage with frequency f to a sinusoidal ignition voltage with frequency f and a relatively high amplitude that is present between transformer output terminals K6 and K9 and between terminals K7 and K8 for lamp connection. The filter that is formed by choke L and capacitor C2 protects the full bridge circuit against the ignition voltage present across the lamp La. When the lamp ignites under the influence of the ignition voltage, the lamp and also the resistor R start conducting a current. In reaction to the occurrence of a voltage drop over resistor R, the circuit part I included in the second control circuit CCII changes the frequency f at which the switching elements comprised in the full bridge circuit are rendered conducting and non-conducting to a value that corresponds to the stationary operation of the lamp. The frequency f is changed to a value that differs substantially from all the resonance frequencies of the piezotransformer so that at that frequency its voltage transformation ratio is very low and the voltage across the lamp is therefore almost completely determined by the inverter.

Figure 2:
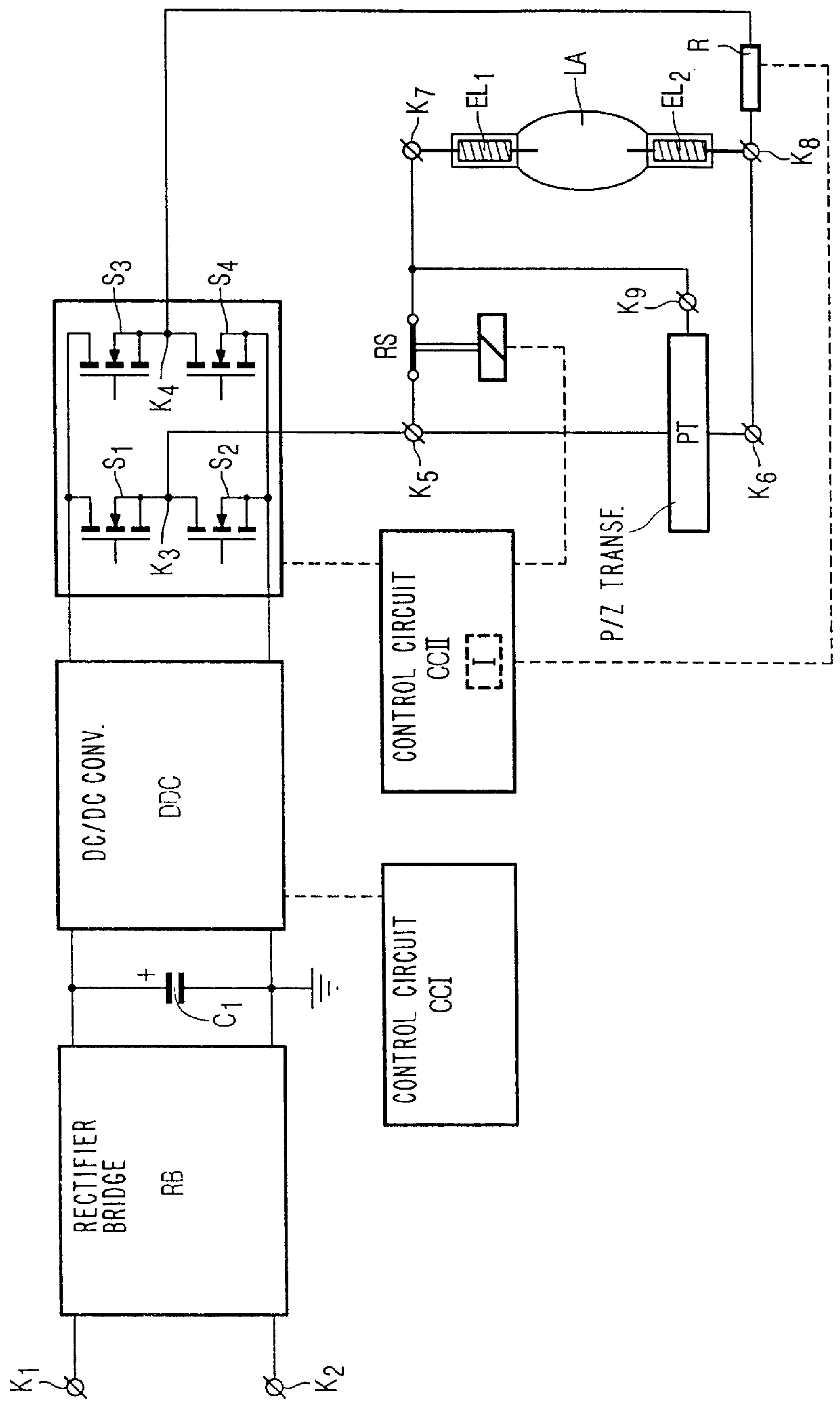
FIG. 2 shows a schematic representation of a second embodiment of a circuit arrangement according to the invention with a lamp connected to it.

The configuration of the circuit arrangement shown in FIG. 2 is very similar to the configuration of the circuit arrangement shown in FIG. 1. Circuit parts and components of the circuit arrangement shown in FIG. 2 that are similar to circuit parts and components in the circuit arrangement shown in FIG. 1 are indicated with the same reference symbol. The filter that is formed by choke L and capacitor C2 in the circuit arrangement shown in FIG. 1 is replaced by a switching element that has a first main electrode connected to terminal K5 and a second main electrode connected to terminal K7 and K9. A control electrode of the switching element is connected to an output terminal of second control circuit CCII. Second control circuit CCII is equipped with control circuitry (not shown in the figure) for controlling the switching element into a non-conductive state during ignition and into a conductive state after ignition. In this way an effective protection of the output terminals of the inverter against the voltage that is present between the output terminals of the piezotransformer during ignition is realized. The operation of the circuit arrangement shown in FIG. 2 is very similar to the operation of the circuit arrangement shown in FIG. 1 and will not be discussed separately.

What is claimed is:

1. A circuit arrangement for operating a lamp, comprising:

circuit input terminals for connection to a supply voltage source, an inverter coupled to said circuit input terminals for generating an AC voltage at a frequency f from a supply voltage supplied by the supply voltage source, and including inverter output terminals, a piezotransformer comprising transformer input terminals, coupled to the inverter output terminals, and transformer output terminals, terminals for lamp connection coupled to the inverter output terminals and to the piezotransformer output terminals, a detector for detecting whether the lamp has ignited, and a protective device coupled between the output terminals of the inverter and the transformer output terminals.

2. A circuit arrangement according to claim 1, wherein the protective device comprises a filter.

3. A circuit arrangement according to claim 1, wherein the protective device comprises a switching element coupled between an inverter output terminal and a piezotransformer output terminal, and control circuitry coupled to the detector and to the switching element for controlling the switching element into a non-conductive state during lamp ignition and into a conductive state after lamp ignition.

4. A circuit arrangement according to claim 1, comprising a frequency control circuit coupled to the detector for changing the inverter frequency f after a transition from lamp ignition to stable lame operation.

5. A circuit arrangement according to claim 4, wherein the frequency control circuit changes the inverter frequency from a first fixed value before lamp ignition to a second fixed value after lamp ignition.

6. A circuit arrangement according to claim 1, wherein the detector comprises a current sensor.

7. A circuit arrangement according to claim 1, wherein the inverter comprises a bridge circuit.

8. A circuit arrangement according to claim 1, wherein the piezotransformer input terminals are connected directly to the inverter output terminals.

9. A circuit for starting and operating a discharge lamp, comprising:

circuit input terminals for connecting a supply voltage source to the circuit, a DC/AC inverter circuit coupled to said circuit input terminals for generating an AC voltage at a high frequency, and including inverter output terminals, a piezoelectric transformer having input terminals coupled to the inverter output terminals, and having output terminals, lamp connection terminals coupled to the inverter output terminals and to the piezoelectric transformer output terminals, a detector for detecting lamp ignition, and means for protecting the inverter coupled to an inverter output terminal and to a piezoelectric transformer output terminal.

10. The discharge lamp starting and operating circuit of claim 9 wherein said inverter protecting means comprises an LC filter circuit having a first terminal coupled to said piezoelectric transformer output terminal and a second terminal coupled to said inverter output terminal.

11. The discharge lamp starting and operating circuit of claim 9 wherein the lamp connection terminals are directly connected to the piezoelectric transformer output terminals and one lamp connection terminal is coupled to one inverter output terminal via an LC filter circuit.

12. The discharge lamp starting and operating circuit of claim 9 further comprising:

a frequency control circuit having a control input coupled to said detector and a control output coupled to a control input of the DC/AC inverter, the frequency control circuit being responsive to a signal from the detector indicating the lamp is in its ignition phase thereby to control the operating frequency of the DC/AC inverter to a frequency value that is close to one resonant frequency of the piezoelectric transformer, and is responsive to a signal from the detector indicative of an ignited lamp so as to control the operating frequency of the DC/AC inverter to a frequency value that differs substantially from all of the resonant frequencies of the piezoelectric transformer.

13. The discharge lamp starting and operating circuit of claim 12 wherein the detector comprises means for sensing current flow through a discharge lamp when connected to the lamp connection terminals.

14. The discharge lamp starting and operating circuit of claim 9 further comprising a frequency control circuit having a control input coupled to said detector and a control output coupled to a frequency control input of the DC/AC inverter thereby to change the DC/AC inverter frequency after lamp ignition and as a function of a signal supplied by the detector indicative of the operational condition of the discharge lamp.

15. The discharge lamp starting and operating circuit of claim 9 wherein the detector comprises a current sensor for monitoring the lamp current.

16. The discharge lamp starting and operating circuit of claim 14 wherein the piezoelectric transformer input terminals are directly connected to the DC/AC inverter output terminals.

17. The discharge lamp starting and operating circuit of claim 9 wherein said piezoelectric transformer input/output terminals comprise a first input terminal connected to a first output terminal of the DC/AC inverter, a first output terminal coupled to a lamp connection terminal and to said first output terminal of the DC/AC inverter via said protecting means, and a third terminal coupled to a second output terminal of the DC/AC inverter.

18. The discharge lamp starting and operating circuit of claim 9 wherein said inverter protecting means comprises a switching device coupled between one output terminal of the piezoelectric transformer and one output terminal of the DC/AC inverter, and a control circuit coupled to the detector and to the switching device for controlling the switching device into a non-conductive state during lamp ignition and into a conductive state subsequent to lamp ignition.

19. The discharge lamp starting and operating circuit of claim 18 wherein the detector comprises means for sensing current flow through a discharge lamp when the lamp is connected to the lamp connection terminals.

* * * * *